US011881922B2

(12) United States Patent
Zhu et al.

(10) Patent No.: US 11,881,922 B2
(45) Date of Patent: Jan. 23, 2024

(54) ENERGY-EFFICIENT BEAM SELECTION

(71) Applicant: QUALCOMM Incorporated, San Diego, CA (US)

(72) Inventors: Jun Zhu, San Diego, CA (US); Mihir Vijay Laghate, San Diego, CA (US); Raghu Narayan Challa, San Diego, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/664,937

(22) Filed: May 25, 2022

(65) Prior Publication Data

US 2023/0388001 A1 Nov. 30, 2023

(51) Int. Cl.
H04B 7/08 (2006.01)
H04W 16/28 (2009.01)
H04L 43/0888 (2022.01)

(52) U.S. Cl.
CPC ............ *H04B 7/088* (2013.01); *H04W 16/28* (2013.01); *H04L 43/0888* (2013.01)

(58) Field of Classification Search
CPC ..... H04B 7/088; H04W 16/28; H04L 43/0888
See application file for complete search history.

(56) References Cited

U.S. PATENT DOCUMENTS

| 11,153,000 B1* | 10/2021 | Landis | H04B 7/088 |
| 11,349,545 B2* | 5/2022 | Tang | H04B 7/088 |
| 11,646,769 B1* | 5/2023 | Zhu | H04B 7/0426 375/267 |
| 2018/0227166 A1* | 8/2018 | Palenius | H04J 11/0059 |
| 2019/0053320 A1* | 2/2019 | Islam | H04W 52/0229 |
| 2019/0281504 A1* | 9/2019 | Su | H04W 52/28 |
| 2020/0022093 A1* | 1/2020 | Han | H04W 52/365 |
| 2020/0052753 A1* | 2/2020 | Raghavan | H04B 7/0695 |
| 2020/0145080 A1* | 5/2020 | Tang | H04B 7/0695 |
| 2020/0328785 A1* | 10/2020 | Lee | H04B 7/0695 |
| 2022/0385345 A1* | 12/2022 | Raghavan | H04B 7/0617 |
| 2022/0394497 A1* | 12/2022 | Raghavan | H04W 16/28 |
| 2023/0011877 A1* | 1/2023 | Rom | H04W 52/0229 |

OTHER PUBLICATIONS

International Search Report and Written Opinion—PCT/US2023/020483—ISA/EPO—dated Aug. 9, 2023.
Wei Z., et al., "Energy Efficient Hybrid Duplexing and Resource Allocation for Distributed Antenna Systems", Globecom 2017—2017 IEEE Global Communications Conference, IEEE, 6 Pages, XP033300373, Dec. 4, 2017, DOI: 10.11 09/GLOCOM.2017.8254797, [retrieved on Jan. 11, 2018], p. 2-5.

* cited by examiner

Primary Examiner — Jaison Joseph
(74) Attorney, Agent, or Firm — Dalei Dong; Harrity & Harrity, LLP

(57) ABSTRACT

Various aspects of the present disclosure generally relate to wireless communication. In some aspects, a user equipment (UE) may identify, for each of one or more candidate beams in a set of candidate beams, a downlink throughput, an uplink throughput, a downlink power consumption, and an uplink power consumption. The UE may select a beam based at least in part on: at least one of the downlink throughput or the uplink throughput, at least one of the downlink power consumption or the uplink power consumption, and one or more throughput thresholds. The UE may communicate using the selected beam. Numerous other aspects are described.

30 Claims, 7 Drawing Sheets

ENERGY-EFFICIENT BEAM SELECTION

FIELD OF THE DISCLOSURE

Aspects of the present disclosure generally relate to wireless communication and to techniques and apparatuses for energy-efficient beam selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include identifying, for each of one or more candidate beams in a set of candidate beams, a downlink throughput, an uplink throughput, a downlink power consumption, and an uplink power consumption. The method may include selecting a beam based at least in part on at least one of the downlink throughput or the uplink throughput, at least one of the downlink power consumption or the uplink power consumption, and one or more throughput thresholds. The method may include communicating using the selected beam.

Some aspects described herein relate to a UE for wireless communication. The UE may include a memory and one or more processors coupled to the memory. The one or more processors may be configured to identify, for each of one or more candidate beams in a set of candidate beams, a downlink throughput, an uplink throughput, a downlink power consumption, and an uplink power consumption. The one or more processors may be configured to select a beam based at least in part on at least one of the downlink throughput or the uplink throughput, at least one of the downlink power consumption or the uplink power consumption, and one or more throughput thresholds. The one or more processors may be configured to communicate using the selected beam.

Some aspects described herein relate to a non-transitory computer-readable medium that stores a set of instructions for wireless communication by a UE. The set of instructions, when executed by one or more processors of the UE, may cause the UE to identify, for each of one or more candidate beams in a set of candidate beams, a downlink throughput, an uplink throughput, a downlink power consumption, and an uplink power consumption. The set of instructions, when executed by one or more processors of the UE, may cause the UE to select a beam based at least in part on at least one of the downlink throughput or the uplink throughput, at least one of the downlink power consumption or the uplink power consumption, and one or more throughput thresholds. The set of instructions, when executed by one or more processors of the UE, may cause the UE to communicate using the selected beam.

Some aspects described herein relate to an apparatus for wireless communication. The apparatus may include means for identifying, for each of one or more candidate beams in a set of candidate beams, a downlink throughput, an uplink throughput, a downlink power consumption, and an uplink power consumption. The apparatus may include means for selecting a beam based at least in part on at least one of the downlink throughput or the uplink throughput, at least one of the downlink power consumption or the uplink power consumption, and one or more throughput thresholds. The apparatus may include means for communicating using the selected beam.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
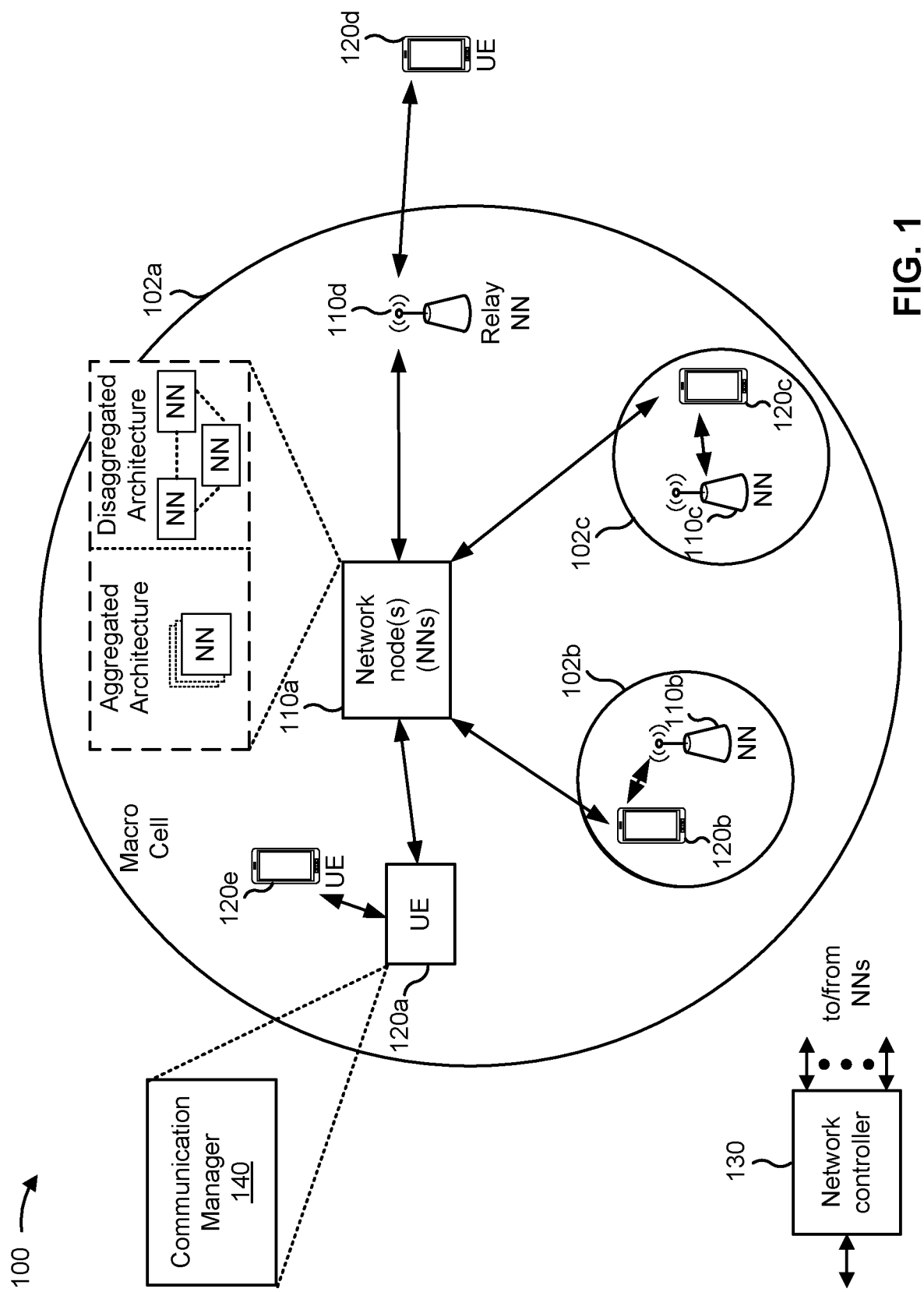
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may identify, for each of one or more candidate beams in a set of candidate beams, a downlink throughput, an uplink throughput, a downlink power consumption, and an uplink power consumption; select a beam based at least in part on: at least one of the downlink throughput or the uplink throughput, at least one of the downlink power consumption or the uplink power consumption, and one or more throughput thresholds; and communicate using the selected beam. Additionally, or alternatively, the communication manager 140 may perform one or more other operations described herein.

As indicated above, FIG. 1 is provided as an example. Other examples may differ from what is described with regard to FIG. 1.

Figure 2:
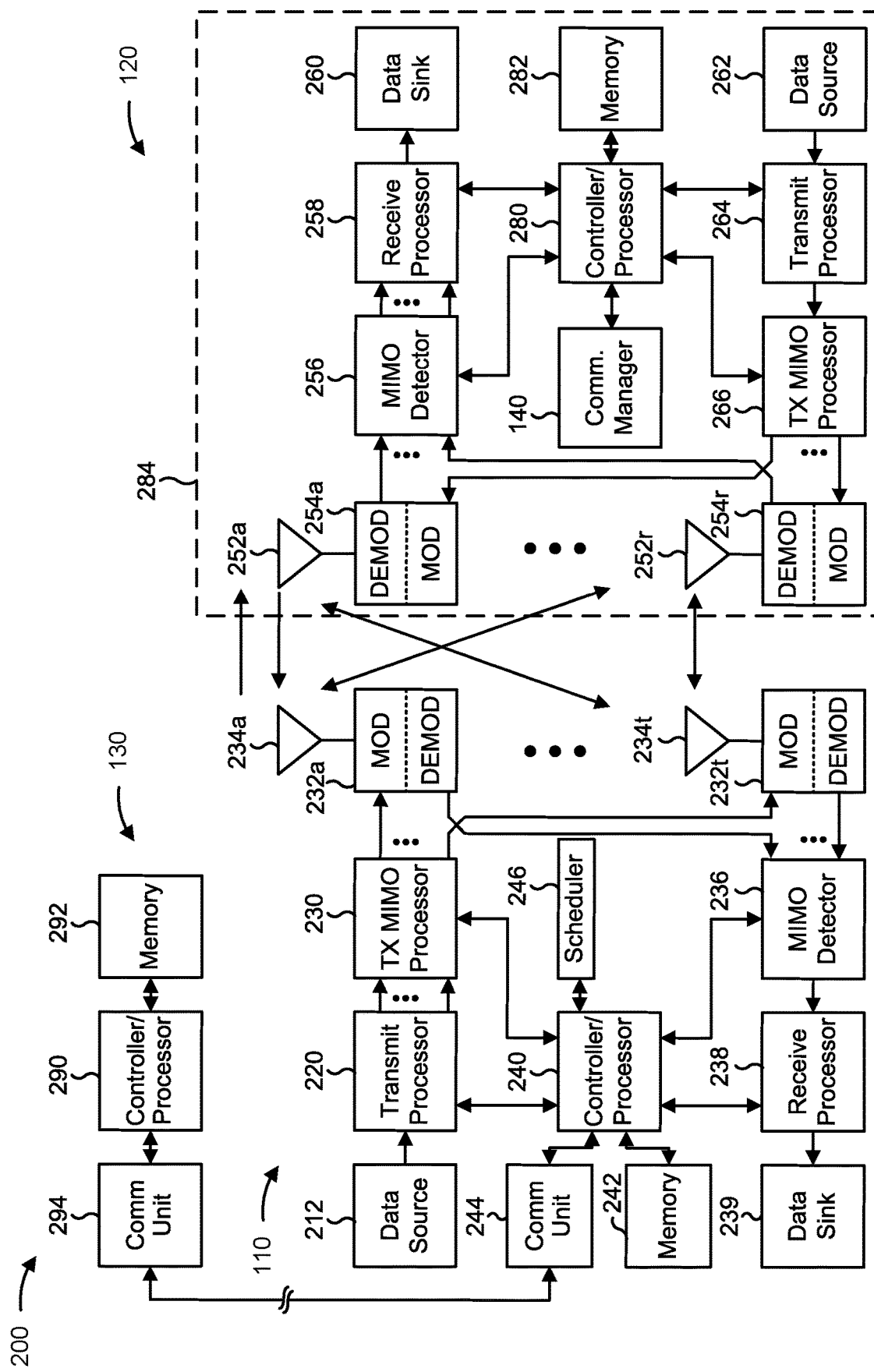
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-7).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-7).

The controller/processor 240 of the network node 110, the controller/processor 280 of the UE 120, and/or any other component(s) of FIG. 2 may perform one or more techniques associated with beamforming, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, and/or other processes as described herein. In some examples, executing instructions may include running the instructions, converting the instructions, compiling the instructions, and/or interpreting the instructions, among other examples.

In some aspects, a UE (e.g., the UE 120) includes means for identifying, for each of one or more candidate beams in a set of candidate beams, a downlink throughput, an uplink throughput, a downlink power consumption, and an uplink power consumption; means for selecting a beam based at least in part on: at least one of the downlink throughput or the uplink throughput, at least one of the downlink power consumption or the uplink power consumption, and one or more throughput thresholds; and/or means for communicating using the selected beam. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
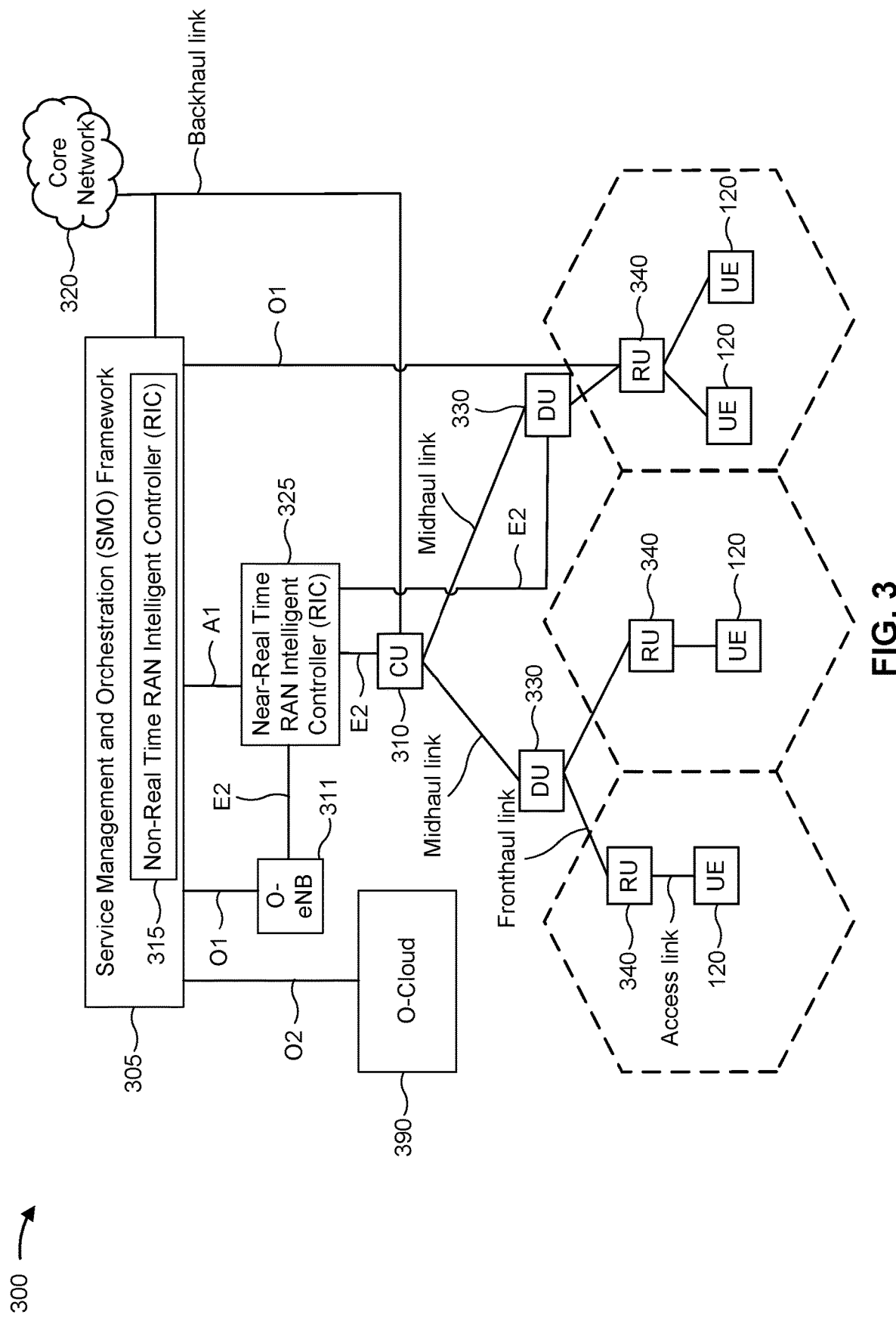
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as AI interface policies).

As indicated above, FIG. 3 is provided as an example. Other examples may differ from what is described with regard to FIG. 3.

Figure 4:
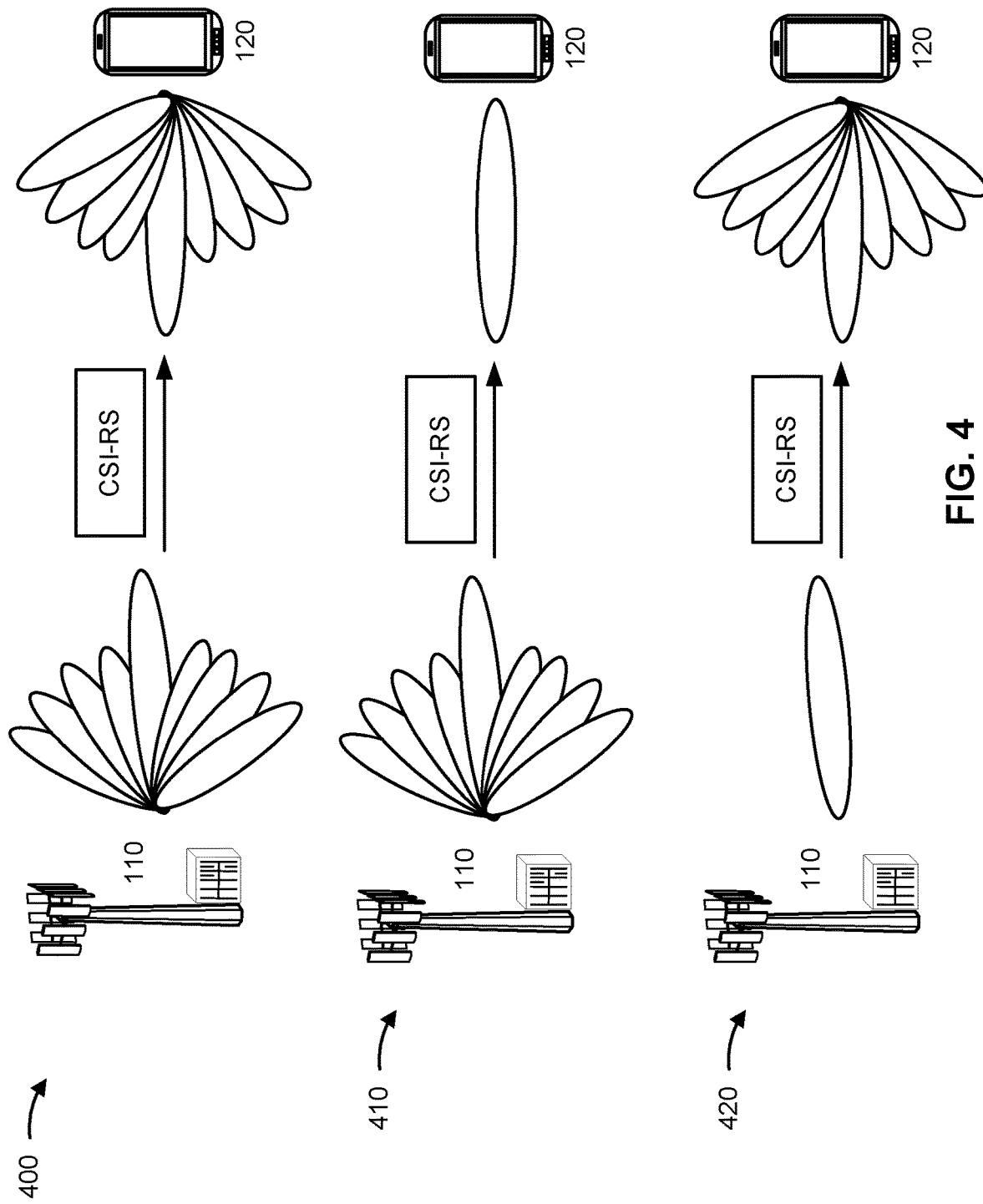
FIG. 4 is a diagram illustrating examples of beam management procedures, in accordance with the present disclosure.

FIG. 4 is a diagram illustrating examples 400, 410, and 420 of channel state information reference signal (CSI-RS) beam management procedures, in accordance with the present disclosure. As shown in FIG. 4, examples 400, 410, and 420 include a UE 120 in communication with a network node 110 in a wireless network (e.g., wireless network 100). However, the devices shown in FIG. 4 are provided as examples, and the wireless network may support communication and beam management between other devices (e.g., between a UE 120 and a network node 110 or transmit receive point (TRP), between a mobile termination node and a control node, between an integrated access and backhaul (IAB) child node and an IAB parent node, and/or between a scheduled node and a scheduling node). In some aspects, the UE 120 and the network node 110 may be in a connected state (e.g., an RRC connected state).

As shown in FIG. 4, example 400 may include a network node 110 and a UE 120 communicating to perform beam management using CSI-RSs. Example 400 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 4 and example 400, CSI-RSs may be configured to be transmitted from the network node 110 to the UE 120. The CSI-RSs may be configured to be periodic (e.g., using RRC signaling), semi-persistent (e.g., using media access control (MAC) control element (MAC-CE) signaling), and/or aperiodic (e.g., using downlink control information (DCI)).

The first beam management procedure may include the network node 110 performing beam sweeping over multiple transmit (Tx) beams. The network node 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same RS resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. While example 400 has been described in connection with CSI-RSs, the first beam management process may also use synchronization signal blocks (SSBs) for beam management in a similar manner as described above.

As shown in FIG. 4, example 410 may include a network node 110 and a UE 120 communicating to perform beam management using CSI-RSs. Example 410 depicts a second beam management procedure (e.g., P2 CSI-RS beam management). The second beam management procedure may be referred to as a beam refinement procedure, a base station beam refinement procedure, a TRP beam refinement procedure, and/or a transmit beam refinement procedure. As shown in FIG. 4 and example 410, CSI-RSs may be configured to be transmitted from the network node 110 to the UE 120. The CSI-RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120.

As shown in FIG. 4, example 420 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 4 and example 420, one or more CSI-RSs may be configured to be transmitted from the network node 110 to the UE 120. The CSI-RSs may be configured to be aperiodic (e.g., using DCI). The third beam management process may include the network node 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the CSI-RS of the transmit beam using the one or more receive beams).

In some cases, the UE 120 and the network node 110 may use beamforming to improve performance associated with communication over a millimeter wave (mmW) channel. For example, a mmW channel (e.g., in FR2 and/or FR4) may suffer from high propagation loss because mmW signals have a higher frequency and a shorter wavelength than various other radio waves used for communications (e.g., sub-6 GHz communications in FR1). As a result, mmW signals often have shorter propagation distances, may be subject to atmospheric attenuation, and/or may be more easily blocked and/or subject to penetration loss through objects or other obstructions, among other examples. For example, a mmW signal may be reflected by lamp posts, vehicles, glass/windowpanes, and/or metallic objects, may be diffracted by edges or corners of buildings and/or walls, and/or may be scattered via irregular objects such as walls and/or human bodies (e.g., a hand blocking an antenna module when a device is operated in a gaming mode). Accordingly, beamforming may be used at both the UE 120 and the network node 110 to counter the propagation loss in a mmW channel and thereby improve performance for mmW communication. For example, to achieve a beamforming gain on a downlink, the network node 110 may generate a downlink transmit beam that is steered in a particular direction and the UE 120 may generate a corresponding downlink receive beam. Similarly, to achieve a beamforming gain on an uplink, the UE 120 may generate an uplink transmit beam that is steered in a particular direction and the network node 110 may generate a corresponding downlink receive beam. In some cases, the UE 120 may be permitted to select the downlink receive beam to optimize reception of a downlink transmission from the network node 110 and/or may be permitted to select the uplink transmit beam to optimize reception at the network node 110 for an uplink transmission by the UE 120. Generally, the UE 120 is free to choose a beam in order to optimize reception of the network node 110's signal at the UE 120 (on the downlink) and to optimize reception of the UE 120's signal at the network node 110 (on the uplink).

A UE 120 may have a number of antennas (e.g., antennas 252). For example, an antenna module may include one or more antennas, such as a plurality of antennas. A beam may be generated by manipulating electrical parameters (e.g., phase, amplitude, and so on) of these antennas relative to one another. A UE 120 may be capable of utilizing all antennas of an antenna module, or a subset (e.g., a proper subset) of antennas of the antenna module. For a beam generated using n antenna elements, the UE 120's power consumption and thermal cost (that is, amount of heat generated) may be related to n. For example, power consumption and thermal cost may be approximately proportional to n. Furthermore, throughput may generally be approximately proportional to n. A larger number of active antennas (e.g., a larger value of n) can generally generate a narrower beam with higher beamforming gain than a smaller number of active antennas, as described above.

In some circumstances, a UE may maximize the number of active antennas (that is, may generate a beam using all antennas of an antenna module), which provides beamforming gain and can reduce interference by narrowing the beam that the UE uses to communicate. As mentioned above, a larger number of active antennas (that is, a larger value of n) is generally associated with higher power consumption, thermal cost, and throughput than a smaller number of active antennas. While maximizing throughput is beneficial for a UE in some ways, there are situations where a threshold level of throughput is sufficient (without needing to maximize throughput). For example, an application or an application layer of the UE may have a throughput requirement, and satisfying the throughput requirement may be sufficient for acceptable operation of the UE. In such circumstances, maximizing the number of active antennas increases power consumption and thermal cost without providing a throughput benefit, so long as the throughput requirement is satisfied. For example, the benefit of "excess throughput," beyond the throughput requirement, afforded by maximizing the number of active antennas may be outweighed by the increased thermal cost and power consumption associated with maximizing the number of active antennas.

Some techniques described herein provide energy-efficient beam selection in order to mitigate power consumption and thermal costs while providing acceptable uplink and/or downlink throughput. For example, for a set of beams, the UE 120 may identify one or more throughputs (e.g., a downlink throughput and/or an uplink throughput) and one or more power consumptions (e.g., a downlink power consumption and/or an uplink power consumption). The UE 120 may select a beam, of the set of beams, based at least in part on the one or more throughputs, the one or more power consumptions, and one or more throughput thresholds (e.g., one or more throughput requirements). For example, the UE 120 may select a beam that is associated with a most favorable (e.g., highest) ratio of throughput to power consumption and that satisfies the one or more throughput thresholds. In some examples, the selected beam may utilize fewer than all antennas of an antenna module of the UE 120, thereby decreasing power consumption and thermal load. For example, the set of beams may include beams utilizing different numbers of antenna elements. Thus, the one or more throughput thresholds are satisfied while power consumption and thermal load may be decreased.

As indicated above, FIG. 4 is provided as an example of beam management procedures. Other examples of beam management procedures may differ from what is described with respect to FIG. 4. For example, the UE 120 and the network node 110 may perform the third beam management procedure before performing the second beam management procedure, and/or the UE 120 and the network node 110 may perform a similar beam management procedure to select a UE transmit beam.

Figure 5:
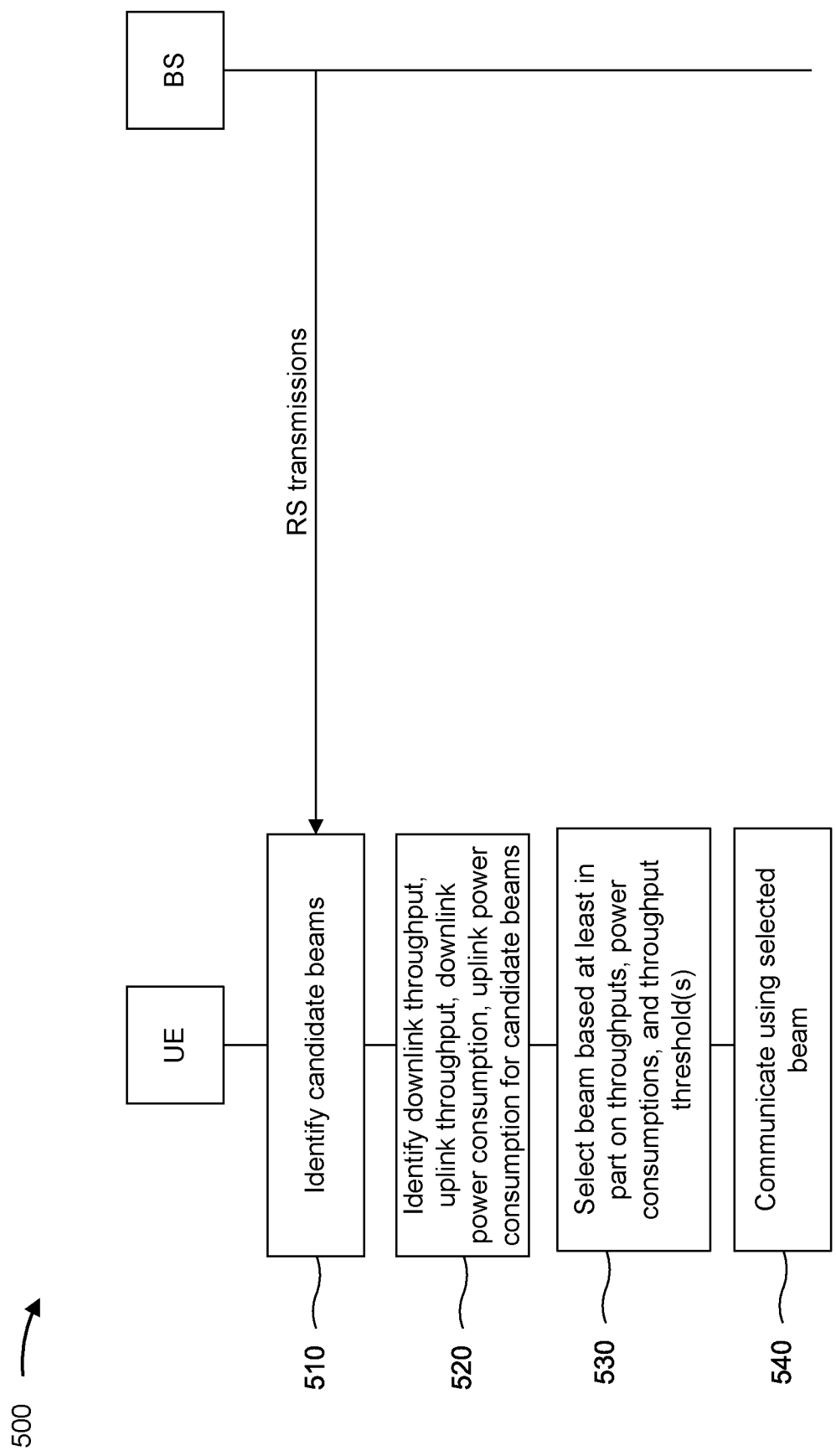
FIG. 5 is a diagram illustrating an example of energy-efficient beam selection, in accordance with the present disclosure.

FIG. 5 is a diagram illustrating an example 500 of energy-efficient beam selection, in accordance with the present disclosure. As shown, example 500 includes a UE (e.g., UE 120) and a network node (e.g., network node 110).

As shown in FIG. 5, and by reference number 510, the UE may identify a set of one or more candidate beams. For example, the UE may identify the set of one or more candidate beams based at least in part on reference signal received power (RSRP) measurements, signal to interference plus noise (SINR) measurements, channel quality indexes, or the like, associated with a set of reference signals (e.g., SSBs and/or CSI-RSs) transmitted by the network node. For example, at periodic intervals (e.g., every X milliseconds), the network node may transmit a synchronization signal (SS) burst set that includes multiple SS bursts, and each SS burst may include one or more SSBs that carry a primary synchronization signal (PSS), a secondary synchronization signal (SSS), and/or a physical broadcast channel (PBCH). In some aspects, multiple SSBs may be included in an SS burst (e.g., with transmission on different beams), and the PSS, the SSS, and/or the PBCH may be the same across each SSB in the SS burst. Accordingly, different SSBs may be beamformed differently (e.g., transmitted using different beams), and may be used for cell search, cell acquisition, beam management, and/or beam selection. For example, in some aspects, the UE may monitor and/or measure SSBs using different receive beams during an initial network access procedure, a beam selection procedure, and/or a beam refinement procedure, among other examples. Accordingly, because the SSB transmissions are always-on signaling that the UE can use to identify strong beams for access link communication with the network node, the UE may identify one or more SSBs with strongest RSRP measurements, which may be used as the set of candidate beams to avoid selecting uplink and/or downlink beams that may degrade channel state feedback (CSF) and/or physical downlink shared channel (PDSCH) performance.

In some aspects, different beams of the one or more candidate beams may be associated with different numbers of antenna elements. For example, an antenna element can be utilized with one or both of a horizontal polarity (indicated herein by "H") or a vertical polarity (indicated herein by "V"). A beam generated using m active antenna elements utilizing a horizontal polarity and n active antenna elements utilizing a vertical polarity is denoted herein as mH+nV. The values of m and n, for a given beam, may or may not be equal to one another. Non-exhaustive examples include 5H+5V, 2H+2V, 1H+1V, 5H+0V, 2H+0V, and 1H+0V. In many cases, a power consumption (and a thermal load) for a beam with a lower number of active antenna elements is lower than a power consumption (and a thermal load) for a beam with a higher number of active antenna elements. In many cases, a power consumption for a given downlink beam (e.g., utilizing a particular number and configuration of active antenna elements) is lower than a power consumption for a given uplink beam with the same number and configuration of active antenna elements.

As shown by reference number 520, the UE may identify a downlink throughput, an uplink throughput, a downlink power consumption, and/or an uplink power consumption for the one or more candidate beams. For example, for a given candidate beam, the UE may identify a downlink throughput, an uplink throughput, a downlink power consumption, and an uplink power consumption. The UE may determine these values for each beam of the one or more candidate beams. Thus, the UE can compare power consumption and throughput across different beams for beam selection, as described below.

A throughput (such as a downlink throughput or an uplink throughput) may represent an estimated throughput, an observed throughput, or a combination thereof, associated with a beam. For example, a throughput may indicate a data rate achieved or estimated while using the beam for communications of the UE. An uplink throughput is a throughput associated with the beam for uplink communication. A downlink throughput is a throughput associated with the beam for downlink communication. A beam can be associated with an uplink throughput and a downlink throughput, since the same beam can be used at the UE for uplink communication (as a transmit beam) and downlink communication (as a receive beam). In some examples, a throughput may be expressed in units of bits per second, though other examples may use different units.

In some aspects, the UE may identify a throughput using a higher layer of the UE, such as an application layer. For example, the UE may obtain an indication of the throughput associated with a beam from the higher layer (e.g., based at least in part on a periodicity, such as every 500 ms). In this example, the throughput comprises one or more real-time throughput values, wherein a real-time throughput value indicates a throughput obtained from the higher layer. In some aspects, the UE may identify a throughput by estimating a throughput (e.g., determining an estimated throughput value). For example, the UE may estimate the throughput based at least in part on at least one of a number of activated carriers, a downlink and uplink duty cycle (such as indicated by an RRC configured uplink/downlink pattern), a number of resource blocks transmitted or received or scheduled at the UE, an estimated or observed spectral efficiency, or a combination thereof. In some aspects, the UE may determine the estimated or observed spectral efficiency based at least in part on RSRP measurements in the horizontal and vertical polarity on a transmit beam and on a receive beam, a maximum transmit power, or a combination thereof.

A power consumption (such as an uplink power consumption or a downlink power consumption) may represent a rate of power consumption (such as in joules per second, though other units can be used) associated with generating a given beam. For example, an uplink power consumption may represent a rate of power consumption at the UE when a given beam is generated for uplink communication, and a downlink power consumption may represent a rate of power consumption at the UE when the given beam is generated for downlink communication. The UE may store information indicating a downlink power consumption and/or an uplink power consumption associated with a beam. The stored information may be pre-configured for the UE (such as by an original equipment manufacturer) or may be determined by the UE in the course of operation (e.g., the UE may generate a beam, identify a power consumption associated with the beam, and store information indicating the power consumption associated with the beam). A power consumption determined by the UE may be referred to herein as a historical power consumption.

In some aspects, the UE may determine one or more throughput thresholds. A throughput threshold indicates a threshold associated with a throughput (e.g., a minimum throughput, an acceptable throughput range, or the like). In some aspects, the UE may determine an uplink throughput threshold and/or a downlink throughput threshold. For example, the UE may determine an uplink throughput threshold and a downlink throughput threshold. In some aspects, the UE may obtain the one or more throughput thresholds, such as from an application or an application layer of the UE. For example, an application or application layer may be associated with an application layer throughput requirement, and the one or more throughput thresholds may be defined so that the application layer throughput requirement is satisfied when the one or more throughput thresholds are satisfied. In some aspects, the one or more throughput thresholds include a downlink throughput threshold and an uplink throughput threshold.

As shown by reference number 530, the UE may select a beam based at least in part on the throughputs (e.g., the downlink throughput and/or the uplink throughputs), the power consumptions (e.g., the downlink power consumption and/or the uplink power consumption), and one or more throughput thresholds. In some aspects, the UE may select the beam based at least in part on a ratio of the downlink throughput and the downlink power consumption. Additionally, or alternatively, the UE may select the beam based at least in part on a ratio of the uplink throughput and the uplink power consumption. Additionally, or alternatively, the UE may select the beam such that the one or more throughput thresholds are satisfied. For example, the UE may select a beam, of one or more beams that satisfy the one or more throughput thresholds, that is associated with a maximal ratio of uplink throughput to uplink power consumption and/or a maximal ratio of downlink throughput to downlink power consumption. Thus, the UE may optimize at least one of the ratio of the downlink throughput and the downlink power consumption or the ratio of the uplink throughput and the uplink power consumption.

In some aspects, the UE may select the beam based at least in part on a weighting factor. The weighting factor may indicate a weight assigned to a downlink relative to an uplink. The weighing factor may be a number, for example, between 0 and 1 (inclusive). In this example, if the weighting factor is 0, the UE may consider only the downlink throughput, the downlink power consumption, and a downlink throughput threshold for selection of the beam. In this example, if the weighting factor is 1, the UE may consider only the uplink throughput, the uplink power consumption, and an uplink throughput threshold for selection of the beam. An example of the weighting factor is provided below.

In some aspects, the UE may select the beam using Formula 1:

$$\text{Selected Beam} = \operatorname*{argmax}_{Beam \in \Omega}\left((1-\alpha)\frac{\text{Tput\_DL}(i)}{\text{Power\_DL}(i)} + \alpha\frac{\text{Tput\_UL}(i)}{\text{Power\_UL}(i)}\right) \text{ such that } Tput_{DL(i)} > TPUT_{DL} \text{ and } Tput_{UL(i)} > TPUT_{UL} \quad (i)$$

In Formula 1, $\Omega$ is the set of candidate beams (e.g., a beam set containing all beams with different numbers of UE antenna elements) and a selected beam i is selected from $\Omega$. Tput_DL(i) and Tput_UL(i) denote the downlink throughput and the uplink throughput associated with beam i, respectively. Power_DL(i) and Power_UL(i) denote the downlink power consumption and the uplink power consumption associated with beam i, respectively. $\alpha$ is the weighting factor between the uplink and the downlink, and can be between 0 and 1 (inclusive). $TPUT_{DL}$ is a downlink throughput threshold and $TPUT_{UL}$ is an uplink throughput threshold. "argmax" is an operation that finds the argument that gives the maximum value from the function of Formula 1. Thus, the UE may select a beam i that maximizes the output of $$\left((1-\alpha)\frac{\text{Tput\_DL}(i)}{\text{Power\_DL}(i)} + \alpha\frac{Tput\_UL(i)}{\text{Power\_UL}(i)}\right)$$

where the beam i is associated with an uplink throughput that satisfies the uplink throughput threshold and a downlink throughput that satisfies the downlink throughput threshold.

As shown by reference number 540, the UE may communicate using the selected beam. For example, the UE may configure a set of antennas (e.g., antennas 252) to generate the selected beam. In some aspects, the UE may transmit a communication using the selected beam. In some aspects, the UE may receive a communication using the selected beam. In some aspects, the UE may transmit information identifying the selected beam. For example, the UE may transmit a report indicating the selected beam to the network node 110. In some aspects, the UE may transmit or receive a communication associated with an application, such as an application from which the uplink throughput threshold and/or the downlink throughput threshold is derived. In this way, the UE may select a beam that satisfies the uplink downlink throughput threshold and/or the uplink throughput threshold, and that maximizes a formula based at least in part on a ratio of a throughput and a power consumption.

As indicated above, FIG. 5 is provided as an example. Other examples may differ from what is described with regard to FIG. 5.

Figure 6:
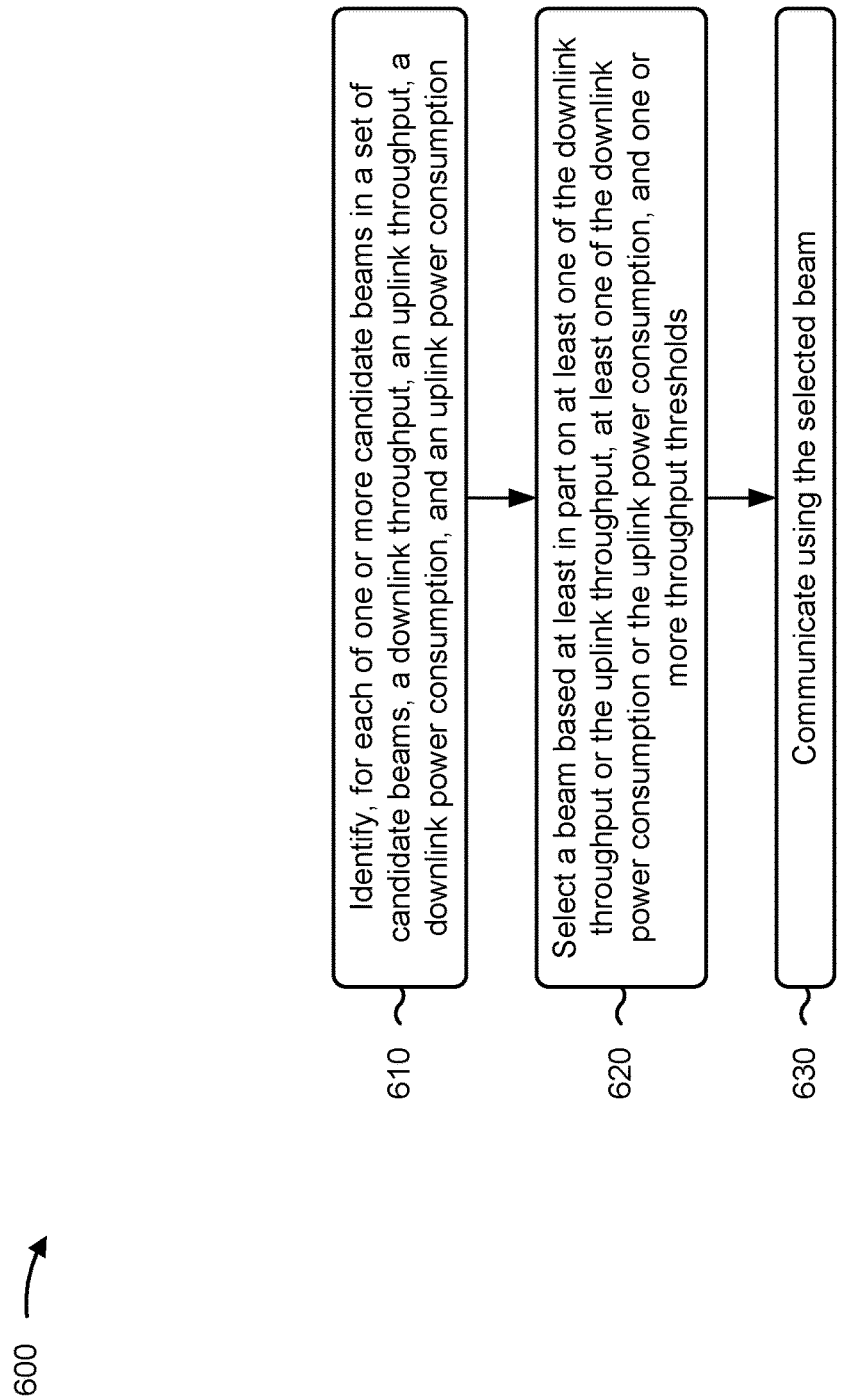
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with energy-efficient beam selection.

As shown in FIG. 6, in some aspects, process 600 may include identifying, for each of one or more candidate beams in a set of candidate beams, a downlink throughput, an uplink throughput, a downlink power consumption, and an uplink power consumption (block 610). For example, the UE (e.g., using communication manager 140 and/or identification component 708, depicted in FIG. 7) may identify, for each of one or more candidate beams in a set of candidate beams, a downlink throughput, an uplink throughput, a downlink power consumption, and an uplink power consumption, as described above.

As further shown in FIG. 6, in some aspects, process 600 may include selecting a beam based at least in part on: at least one of the downlink throughput or the uplink throughput, at least one of the downlink power consumption or the uplink power consumption, and one or more throughput thresholds (block 620). For example, the UE (e.g., using communication manager 140 and/or selection component 710, depicted in FIG. 7) may select a beam based at least in part on: at least one of the downlink throughput or the uplink throughput, at least one of the downlink power consumption or the uplink power consumption, and one or more throughput thresholds, as described above.

As further shown in FIG. 6, in some aspects, process 600 may include communicating using the selected beam (block 630). For example, the UE (e.g., using communication manager 140 and/or beamforming component 712, depicted in FIG. 7) may communicate using the selected beam, as described above.

Process 600 may include additional aspects, such as any single aspect or any combination of aspects described below and/or in connection with one or more other processes described elsewhere herein.

In a first aspect, the selection of the beam is based at least in part on optimizing at least one of a ratio of the downlink throughput and the downlink power consumption, or a ratio of the uplink throughput and the uplink power consumption.

In a second aspect, alone or in combination with the first aspect, the throughput threshold is based at least in part on an application layer throughput requirement.

In a third aspect, alone or in combination with one or more of the first and second aspects, the downlink throughput and the uplink throughput comprise real-time throughput values.

In a fourth aspect, alone or in combination with one or more of the first through third aspects, the downlink throughput and the uplink throughput comprise estimated throughput values.

In a fifth aspect, alone or in combination with one or more of the first through fourth aspects, an estimated throughput value, of the estimated throughput values, is based at least in part on at least one of a number of activated carriers, a downlink and uplink duty cycle, a number of resource blocks, or an estimated spectral efficiency.

In a sixth aspect, alone or in combination with one or more of the first through fifth aspects, the downlink power consumption and the uplink power consumption are based at least in part on historical power consumption associated with the set of candidate beams.

In a seventh aspect, alone or in combination with one or more of the first through sixth aspects, the one or more throughput thresholds comprise a downlink throughput threshold and an uplink throughput threshold.

In an eighth aspect, alone or in combination with one or more of the first through seventh aspects, the selection of the beam is based at least in part on a weighting factor that indicates a weight assigned to a downlink relative to an uplink.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
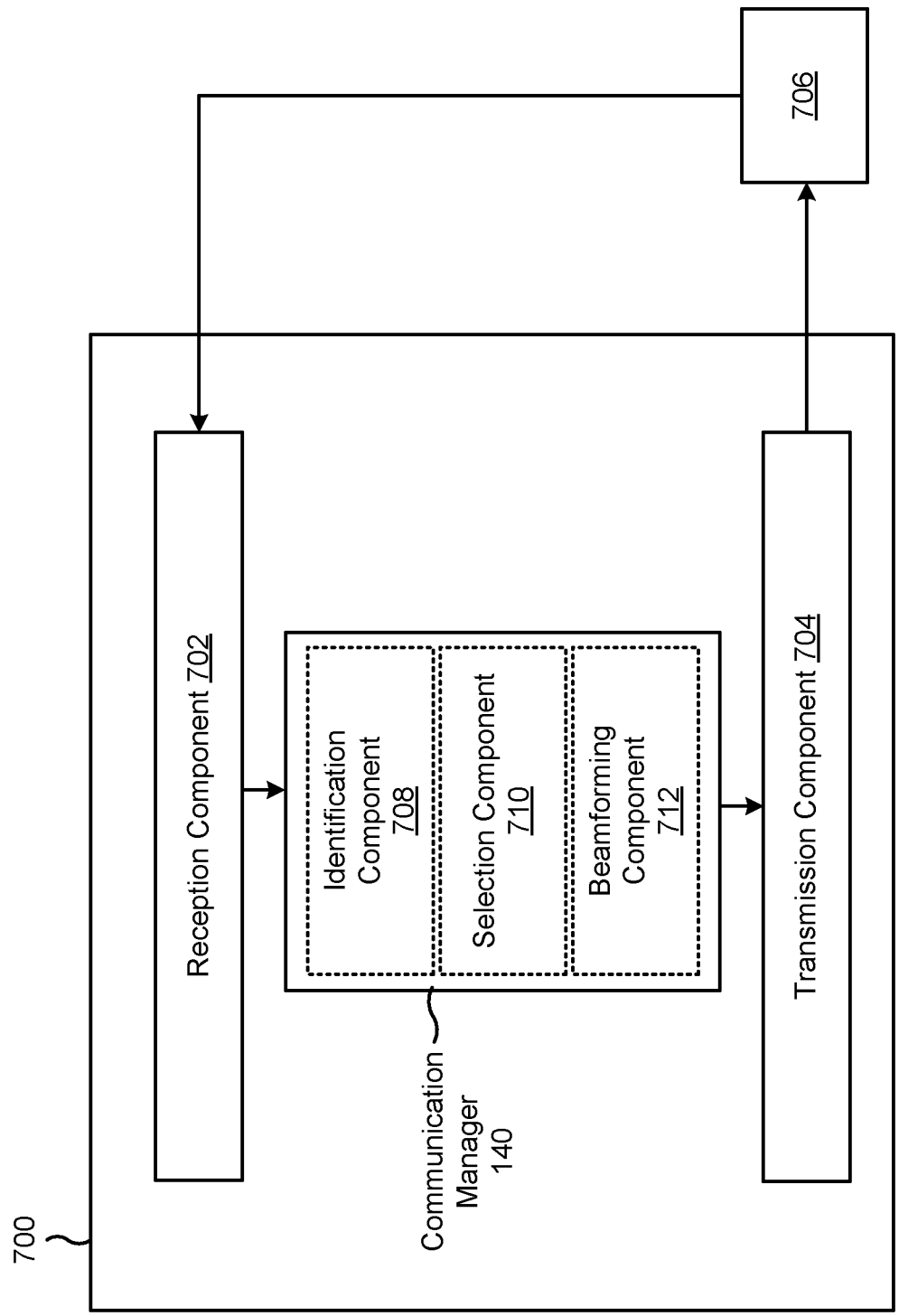
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of an identification component 708, a selection component 710, or a beamforming component 712, among other examples.

In some aspects, the apparatus 700 may be configured to perform one or more operations described herein in connection with FIGS. 3-5. Additionally, or alternatively, the apparatus 700 may be configured to perform one or more processes described herein, such as process 600 of FIG. 6, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The identification component 708 may identify, for each of one or more candidate beams in a set of candidate beams, a downlink throughput, an uplink throughput, a downlink power consumption, and an uplink power consumption. The selection component 710 may select a beam based at least in part on at least one of the downlink throughput or the uplink throughput, at least one of the downlink power consumption or the uplink power consumption, and one or more throughput thresholds. The beamforming component 712 may communicate using the selected beam.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: identifying, for each of one or more candidate beams in a set of candidate beams, a downlink throughput, an uplink throughput, a downlink power consumption, and an uplink power consumption; selecting a beam based at least in part on: at least one of the downlink throughput or the uplink throughput, at least one of the downlink power consumption or the uplink power consumption, and one or more throughput thresholds; and communicating using the selected beam.

Aspect 2: The method of Aspect 1, wherein the selection of the beam is based at least in part on optimizing at least one of: a ratio of the downlink throughput and the downlink power consumption, or a ratio of the uplink throughput and the uplink power consumption.

Aspect 3: The method of any of Aspects 1-2, wherein the throughput threshold is based at least in part on an application layer throughput requirement.

Aspect 4: The method of any of Aspects 1-3, wherein the downlink throughput and the uplink throughput comprise real-time throughput values.

Aspect 5: The method of any of Aspects 1-4, wherein the downlink throughput and the uplink throughput comprise estimated throughput values.

Aspect 6: The method of any of Aspects 1-5, wherein an estimated throughput value, of the estimated throughput values, is based at least in part on at least one of: a number of activated carriers, a downlink and uplink duty cycle, a number of resource blocks, or an estimated spectral efficiency.

Aspect 7: The method of any of Aspects 1-6, wherein the downlink power consumption and the uplink power consumption are based at least in part on historical power consumption associated with the set of candidate beams.

Aspect 8: The method of any of Aspects 1-7, wherein the one or more throughput thresholds comprise a downlink throughput threshold and an uplink throughput threshold.

Aspect 9: The method of any of Aspects 1-8, wherein the selection of the beam is based at least in part on a weighting factor that indicates a weight assigned to a downlink relative to an uplink.

Aspect 10: An apparatus for wireless communication at a device, comprising a processor; memory coupled with the processor; and instructions stored in the memory and executable by the processor to cause the apparatus to perform the method of one or more of Aspects 1-9.

Aspect 11: A device for wireless communication, comprising a memory and one or more processors coupled to the memory, the one or more processors configured to perform the method of one or more of Aspects 1-9.

Aspect 12: An apparatus for wireless communication, comprising at least one means for performing the method of one or more of Aspects 1-9.

Aspect 13: A non-transitory computer-readable medium storing code for wireless communication, the code comprising instructions executable by a processor to perform the method of one or more of Aspects 1-9.

Aspect 14: A non-transitory computer-readable medium storing a set of instructions for wireless communication, the set of instructions comprising one or more instructions that, when executed by one or more processors of a device, cause the device to perform the method of one or more of Aspects 1-9.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    identifying, for each of one or more candidate beams in a set of candidate beams, a downlink throughput, an uplink throughput, a downlink power consumption, and an uplink power consumption;
    selecting a beam based at least in part on:
        at least one of the downlink throughput or the uplink throughput,
        at least one of the downlink power consumption or the uplink power consumption, and
        one or more throughput thresholds; and
    communicating using the selected beam.

2. The method of claim 1, wherein the selection of the beam is based at least in part on optimizing at least one of:
    a ratio of the downlink throughput and the downlink power consumption, or
    a ratio of the uplink throughput and the uplink power consumption.

3. The method of claim 1, wherein the throughput threshold is based at least in part on an application layer throughput requirement.

4. The method of claim 1, wherein the downlink throughput and the uplink throughput comprise real-time throughput values.

5. The method of claim 1, wherein the downlink throughput and the uplink throughput comprise estimated throughput values.

6. The method of claim 5, wherein an estimated throughput value, of the estimated throughput values, is based at least in part on at least one of:
    a number of activated carriers,
    a downlink and uplink duty cycle,
    a number of resource blocks, or
    an estimated spectral efficiency.

7. The method of claim 1, wherein the downlink power consumption and the uplink power consumption are based at least in part on historical power consumption associated with the set of candidate beams.

8. The method of claim 1, wherein the one or more throughput thresholds comprise a downlink throughput threshold and an uplink throughput threshold.

9. The method of claim 1, wherein the selection of the beam is based at least in part on a weighting factor that indicates a weight assigned to a downlink relative to an uplink.

10. A user equipment (UE) for wireless communication, comprising:
    a memory; and
    one or more processors, coupled to the memory, configured to:
        identify, for each of one or more candidate beams in a set of candidate beams, a downlink throughput, an uplink throughput, a downlink power consumption, and an uplink power consumption;
        select a beam based at least in part on:
            at least one of the downlink throughput or the uplink throughput,
            at least one of the downlink power consumption or the uplink power consumption, and
            one or more throughput thresholds; and
        communicate using the selected beam.

11. The UE of claim 10, wherein the selection of the beam is based at least in part on optimizing at least one of:
    a ratio of the downlink throughput and the downlink power consumption, or
    a ratio of the uplink throughput and the uplink power consumption.

12. The UE of claim 10, wherein the throughput threshold is based at least in part on an application layer throughput requirement.

13. The UE of claim 10, wherein the downlink throughput and the uplink throughput comprise real-time throughput values.

14. The UE of claim 10, wherein the downlink throughput and the uplink throughput comprise estimated throughput values.

15. The UE of claim 14, wherein an estimated throughput value, of the estimated throughput values, is based at least in part on at least one of:
    a number of activated carriers,
    a downlink and uplink duty cycle,
    a number of resource blocks, or
    an estimated spectral efficiency.

16. The UE of claim 10, wherein the downlink power consumption and the uplink power consumption are based at least in part on historical power consumption associated with the set of candidate beams.

17. The UE of claim 10, wherein the one or more throughput thresholds comprise a downlink throughput threshold and an uplink throughput threshold.

18. The UE of claim 10, wherein the selection of the beam is based at least in part on a weighting factor that indicates a weight assigned to a downlink relative to an uplink.

19. A non-transitory computer-readable medium storing a set of instructions for wireless communication, the set of instructions comprising:
    one or more instructions that, when executed by one or more processors of a user equipment (UE), cause the UE to:

identify, for each of one or more candidate beams in a set of candidate beams, a downlink throughput, an uplink throughput, a downlink power consumption, and an uplink power consumption;
select a beam based at least in part on:
at least one of the downlink throughput or the uplink throughput,
at least one of the downlink power consumption or the uplink power consumption, and
one or more throughput thresholds; and
communicate using the selected beam.

20. The non-transitory computer-readable medium of claim 19, wherein the selection of the beam is based at least in part on optimizing at least one of:
a ratio of the downlink throughput and the downlink power consumption, or
a ratio of the uplink throughput and the uplink power consumption.

21. The non-transitory computer-readable medium of claim 19, wherein the throughput threshold is based at least in part on an application layer throughput requirement.

22. The non-transitory computer-readable medium of claim 19, wherein the downlink throughput and the uplink throughput comprise real-time throughput values.

23. The non-transitory computer-readable medium of claim 19, wherein the downlink throughput and the uplink throughput comprise estimated throughput values.

24. The non-transitory computer-readable medium of claim 23, wherein an estimated throughput value, of the estimated throughput values, is based at least in part on at least one of:
a number of activated carriers,
a downlink and uplink duty cycle,
a number of resource blocks, or
an estimated spectral efficiency.

25. The non-transitory computer-readable medium of claim 19, wherein the downlink power consumption and the uplink power consumption are based at least in part on historical power consumption associated with the set of candidate beams.

26. The non-transitory computer-readable medium of claim 19, wherein the one or more throughput thresholds comprise a downlink throughput threshold and an uplink throughput threshold.

27. The non-transitory computer-readable medium of claim 19, wherein the selection of the beam is based at least in part on a weighting factor that indicates a weight assigned to a downlink relative to an uplink.

28. An apparatus for wireless communication, comprising:
means for identifying, for each of one or more candidate beams in a set of candidate beams, a downlink throughput, an uplink throughput, a downlink power consumption, and an uplink power consumption;
means for selecting a beam based at least in part on:
at least one of the downlink throughput or the uplink throughput,
at least one of the downlink power consumption or the uplink power consumption, and
one or more throughput thresholds; and
means for communicating using the selected beam.

29. The apparatus of claim 28, wherein the selection of the beam is based at least in part on optimizing at least one of:
a ratio of the downlink throughput and the downlink power consumption, or
a ratio of the uplink throughput and the uplink power consumption.

30. The apparatus of claim 28, wherein the throughput threshold is based at least in part on an application layer throughput requirement.

* * * * *